United States Patent [19]

Haga et al.

[11] Patent Number: 4,476,738

[45] Date of Patent: Oct. 16, 1984

[54] GEAR-SHIFT MECHANISM FOR POWER TRANSMISSION UNITS

[75] Inventors: Shozi Haga; Tadashi Nozaki, both of Toyota, Japan

[73] Assignee: Toyota Jidosha Kabushiki Kaisha, Toyota, Japan

[21] Appl. No.: 412,240

[22] Filed: Aug. 27, 1982

[30] Foreign Application Priority Data

Sep. 4, 1981 [JP] Japan .................... 56-132185

[51] Int. Cl.³ .................... G05G 9/12; G05G 5/10
[52] U.S. Cl. .................... 74/475; 74/477
[58] Field of Search .................... 74/473 R, 475, 476, 74/477

[56] References Cited

U.S. PATENT DOCUMENTS

| | | | |
|---|---|---|---|
| 3,731,554 | 5/1973 | Renk | 74/475 X |
| 3,971,265 | 7/1976 | Kurisu | 74/473 R X |
| 4,022,079 | 5/1977 | Hidaka | 74/476 |
| 4,275,613 | 6/1981 | Worner et al. | 74/475 |

FOREIGN PATENT DOCUMENTS 617722 2/1949 United Kingdom .................... 74/477

Primary Examiner—Allan D. Herrmann
Attorney, Agent, or Firm—Oblon, Fisher, Spivak, McClelland & Maier

[57] ABSTRACT

A gear-shift mechanism for a power transmission unit includes a fork shaft slidably supported from a housing assembly to be selectively shifted from its neutral position to forward and reverse positions, a detent mechanism for selectively retaining the fork shaft in its neutral and shifted positions, a shift head member slidable on the fork shaft, a one-way engagement mechanism for effecting engagement of the shift head member with the fork shaft in axial movement of the fork shaft to and away from its reverse position, and a shift arm member pivoted to the inner wall structure of the housing assembly and linked with the shift head member to retain an idler gear in its neutral position and to engage the same with driving and driven gears. The shift arm member is formed with a cam face, and a spring loaded cam follower is assembled within the inner wall structure to be in engagement with the cam face of the shift arm member to effect disengagement of the idler gear from the driving and driven gears.

7 Claims, 8 Drawing Figures

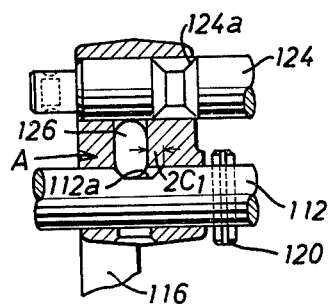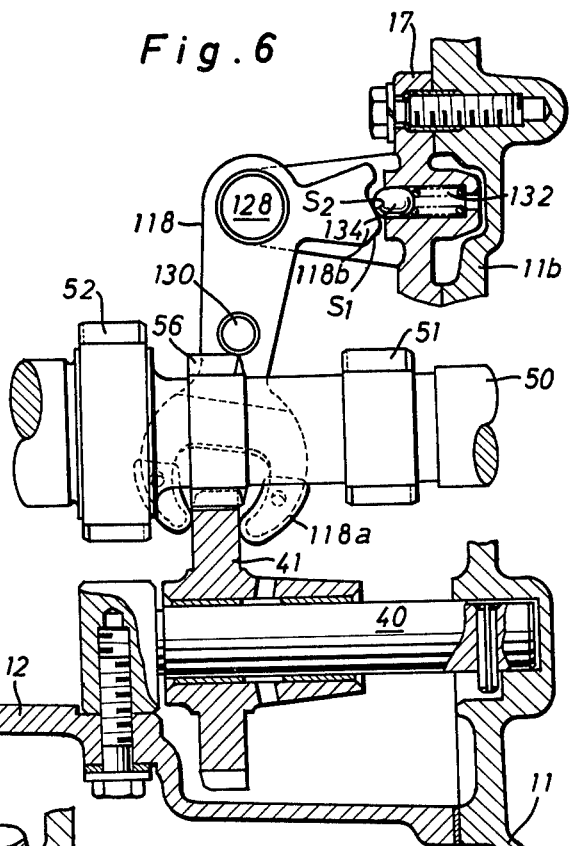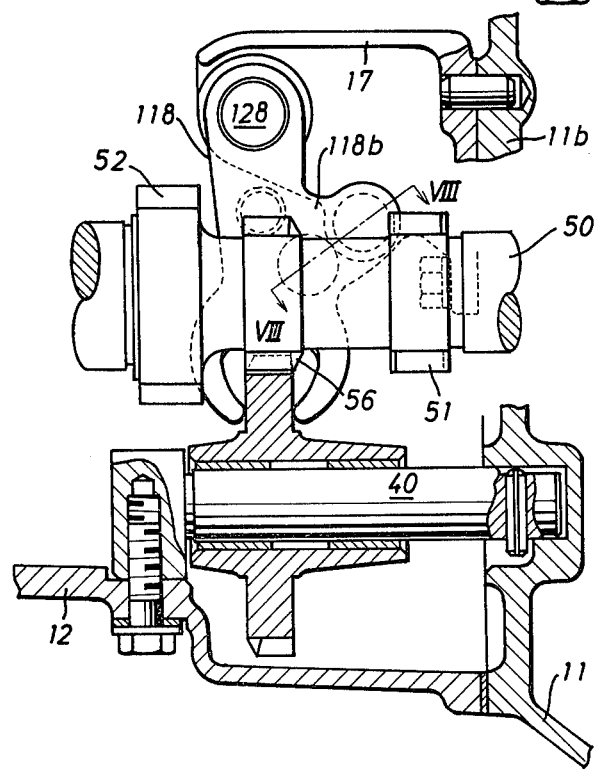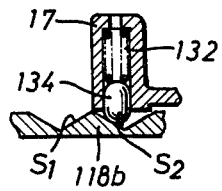

GEAR-SHIFT MECHANISM FOR POWER TRANSMISSION UNITS

BACKGROUND OF THE INVENTION

The present invention relates to power transmission units for motor vehicles, and more particularly to an improvement of a gear-shift mechanism for power transmission units.

Power transmission units are known of the type which includes input and output shafts supported in parallel to each other from a housing assembly for the unit, an idler shaft supported in parallel with the shafts from the housing assembly, driving and driven gears respectively mounted on the input and output shafts, an idler gear axially slidable on the idler shaft, a fork shaft slidably supported in parallel with the idler shaft from the housing assembly and being operatively connected to a manual shift lever to be selectively shifted from its neutral position to a forward or reverse position, a detent mechanism mounted on the housing assembly for selectively retaining the fork shaft in its neutral and shifted positions under a resilient load acting thereon, a shift head member slidable on the fork shaft, a one-way engagement mechanism for effecting engagement of the shift head member with the fork shaft in axial movement of the fork shaft to and away from its reverse position, and a shift arm member pivoted to the inner wall structure of the housing assembly and linked with the shift head member, and in which the idler gear is carried by the shift arm member to be retained in its neutral position and to be engaged with the driving and driven gears in the axial movement of the fork shaft to its reverse position.

In such power transmission units as described above, the detent mechanism acts to define the neutral and shifted positions of the fork shaft, and axial clearances are provided within the one-way engagement mechanism to avoid assembling failure caused by error in the manufacturing processes. For this reason, if the axial clearances result in interference between the idler gear and its adjacent gears or in vibrative displacement of the shift head and arm members and the idler gear in their neutral positions, there will occur unpleasant noises in operation of the transmission unit. In case the axial clearances result in insufficient return of the shift head and arm members to their neutral positions in shifting operation of the fork shaft, complete disengagement of the idler gear from the driving and driven gears may not be effected.

SUMMARY OF THE INVENTION

It is, therefore, a primary object of the present invention to provide an improved gear-shift mechanism for the power transmission units which is capable of reliably effecting disengagement of the idler gear from the driving and driven gears in spite of provision of the axial clearances in the one-way engagement mechanism and capable of resiliently retaining the shift head and arm members and the idler gear in their neutral positions to prevent unpleasant noises in operation of the transmission unit.

According the present invention, the primary object is accomplished by provision of an improved gearshift mechanism for a power transmission unit of the type described above, in which one of the shift head and arm members is provided with means for effecting disengagement of the idler gear from the driving and driven gears under a resilient load less than that acting on the detent mechanism when the shift head member is shifted away from its reverse position to be retained in its neutral position, and in which at least one of the shift head and arm members and the idler gear is arranged to abut against a stationary portion in the housing assembly.

It is preferable that the means for effecting disengagement of the idler gear from the driving and driven gears comprises a cam portion of the shift arm member which is formed with a cam face, and a spring loaded cam follower means assembled within the inner wall structure of the housing assembly and being in engagement with the cam face of the shift arm member for effecting disengagement of the idler gear from the driving and driven gears when the shift head member is shifted away from its reverse position to be retained in its neutral position.

BRIEF DESCRIPTION OF THE DRAWINGS

Additional objects and advantages of the present invention will be more readily apparent from the following detailed description of preferred embodiments thereof when taken together with the accompanying drawings in which:

FIG. 5 is an enlarged sectional view illustrating a one-way engagement mechanism in the gear-shift mechanism conditioned in its reverse position;

FIG. 6 is an enlarged sectional view illustrating the main portion of the gear-shift mechanism conditioned in its reverse position;

FIG. 7 is an enlarged sectional view illustrating a modification of the gear-shift mechanism; and FIG. 8 is a cross-sectional view taken along line VIII—VIII in FIG. 7.

DETAILED DESCRIPTION OF THE PREFERRED EMBODIMENTS

Figure 1:
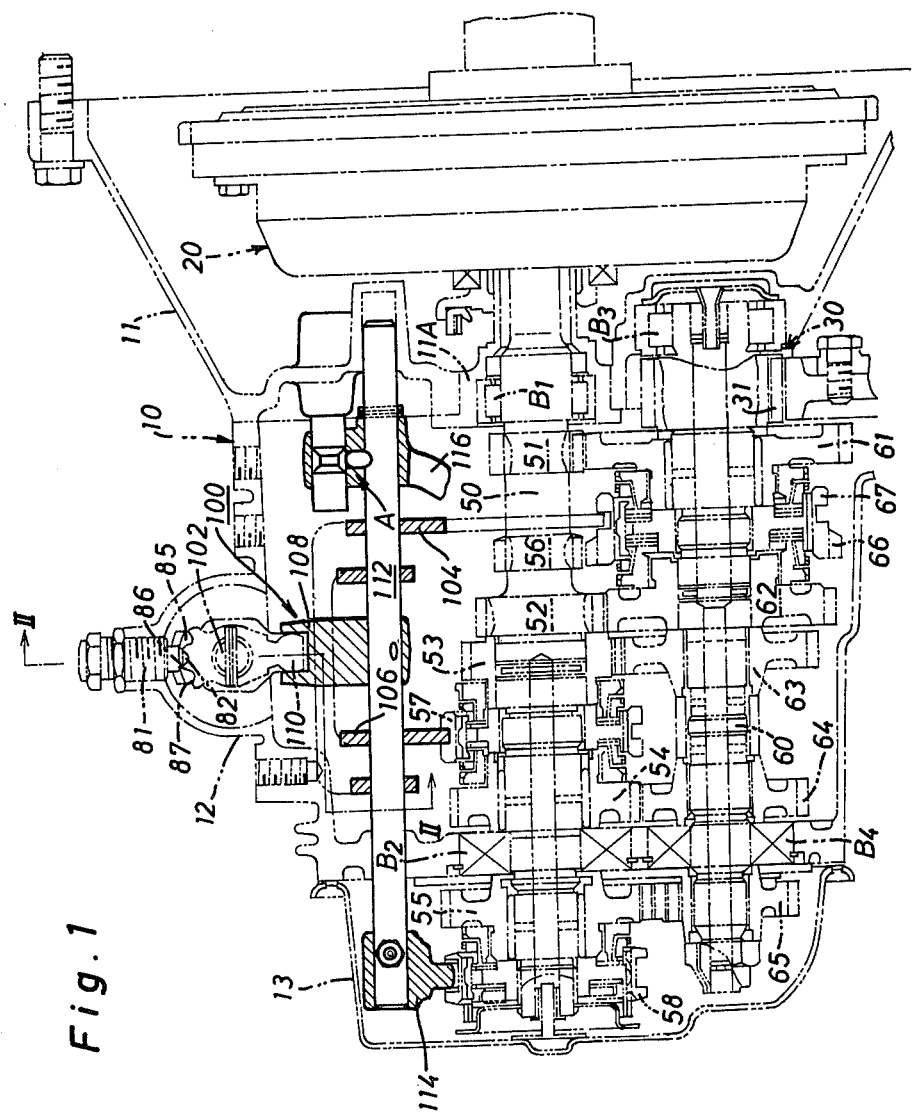
FIG. 1 illustrates an arrangement of a gear-shift mechanism for a power transmission unit in accordance with the present invention.

Referring now to the drawings, particularly in FIG. 1, there is illustrated an arrangement of a gear-shift mechanism 100 in a power transmission unit which includes a housing assembly 10 composed of a trans-axle casing 11, a transmission casing 12 and a cover plate 13. The trans-axle casing 11 is arranged to contain a clutch assembly 20 therein and to be secured at its right end seating face to a cylinder block of an internal combustion engine of the transversely mounting type. The transmission casing 12 is secured at its right end seating face to trans-axle casing 11 in a fluidtight manner and carries thereon a final drive gearing 30 which is located adjacent the lower portion of clutch assembly 20. The left end of transmission casing 12 is sealingly closed by the cover plate 13 to retain lubricating oil within the housing assembly 10.

Assembled within the housing assembly 10 is an input shaft 50 which is arranged coaxially with an output member of clutch assembly 20 and in parallel with an output shaft 60. The input shaft 50 is supported by a pair of axially spaced bearings $B_1$ and $B_2$ respectively from trans-axle casing 11 and transmission casing 12, which input shaft 50 is provided thereon with first to fifth speed driving gears 51-55, a reverse driving gear 56, and change-over sleeves 57, 58 respectively for 3-4 speeds and 5 speed. The bearing $B_1$ is fixed in place by a bearing retainer 11A. The output shaft 60 is supported by a pair of axially spaced bearings $B_3$ and $B_4$ respectively from trans-axle casing 11 and transmission casing 12, which output shaft 60 is provided thereon with first to fifth speed driven gears 61-65, a reverse driven gear 66 and a change-over sleeve 67 for 1-2 speeds. The output shaft 60 is further provided thereon with a pinion 31 of the final drive gearing 30.

Assembled within the upper portion of transmission casing 12 is a shift and select shaft 102 of the gear-shift mechanism 100 for effecting selection of gear ratios between output and input shafts 50 and 60. As can be well seen in FIG. 2, the shift and select shaft 102 is integrally provided thereon with an inner lever member 110 which is selectively brought into engagement with each head of shift forks 104, 106 and a shift head 108. The shift and select shaft 102 is rotatably and slidably supported from transmission casing 12 and from a cover member 14 threaded into housing 12 in a fluidtight manner and extends outwardly through an oil seal member 15 and a dust boot 16. The outer end of shaft 102 is operatively connected through a shifting linkage (not shown) to a manual shift lever which is arranged to effect axial movement of the shaft 102 in its selecting operation and to effect rotary movement of the shaft 102 in its shifting operation. The shift and select shaft 102 is further provided thereon with a select return mechanism 70 and a detent mechanism 80.

The select return mechanism 70 acts to retain the manual shift lever in its neutral position, which mechanism 70 includes a pair of axially spaced fasteners 71, 72 fixed to shaft 102, a pair of axially spaced spring holders 73, 74 slidable on shaft 102, a pair of axially spaced compression coil springs 75, 76 in surrounding relationship with shaft 102, and a reverse restrict lever 77. The reverse restrict lever 77 acts as a stopper for mechanism 70 and is also in the form of a component member in a conventional mechanism for prevention of an error in shifting operation of the manual shift lever in the reverse direction. In such arrangement, the select return mechanism 70 acts to retain the shift and select shaft 102 in its neutral position so as to maintain engagement of the inner lever member 110 with the head of shift fork 106 for change-over between 3-4 speeds.

Figure 2:
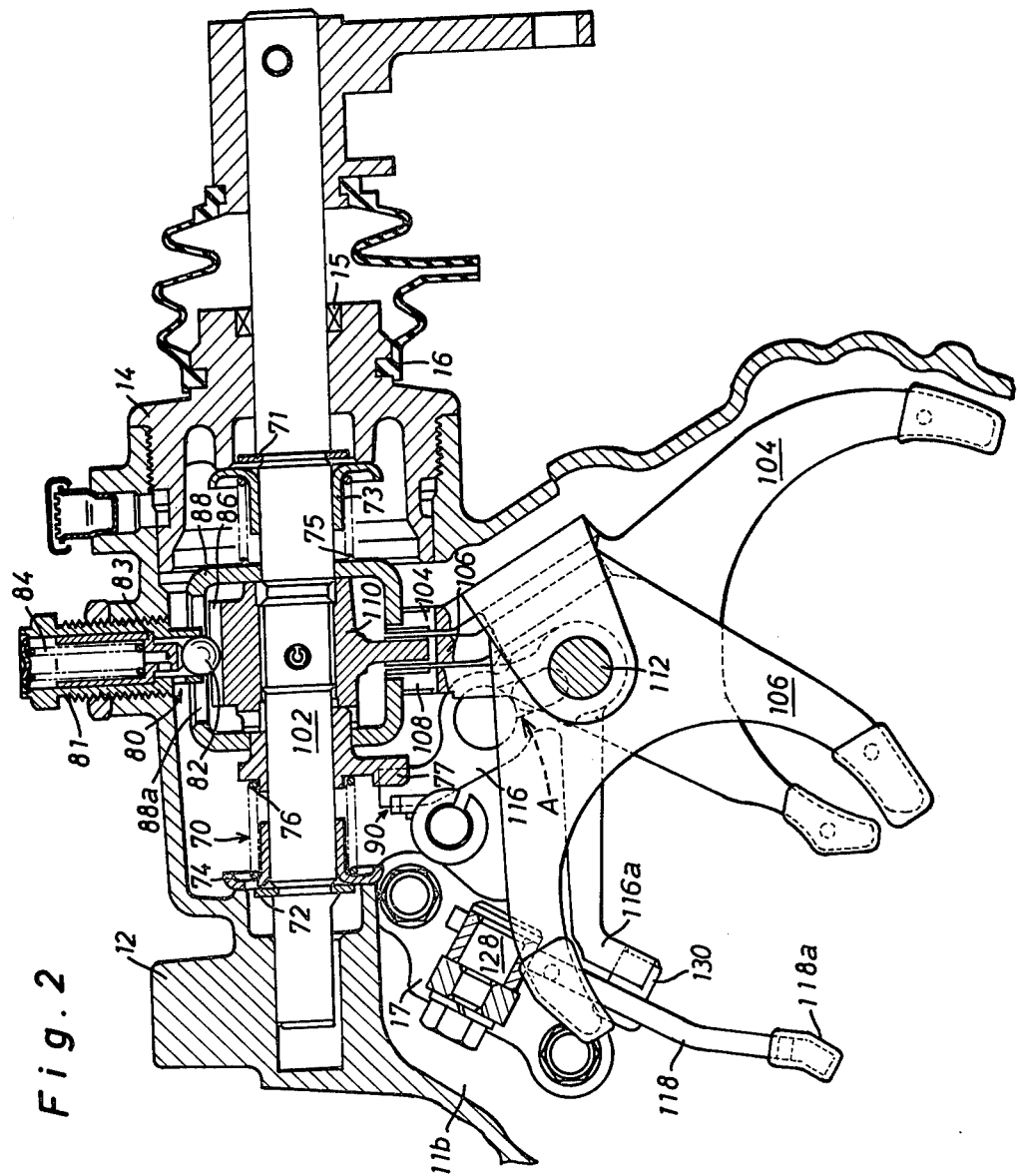
FIG. 2 is an enlarged sectional view taken along line II—II in FIG. 1.
Figure 3:
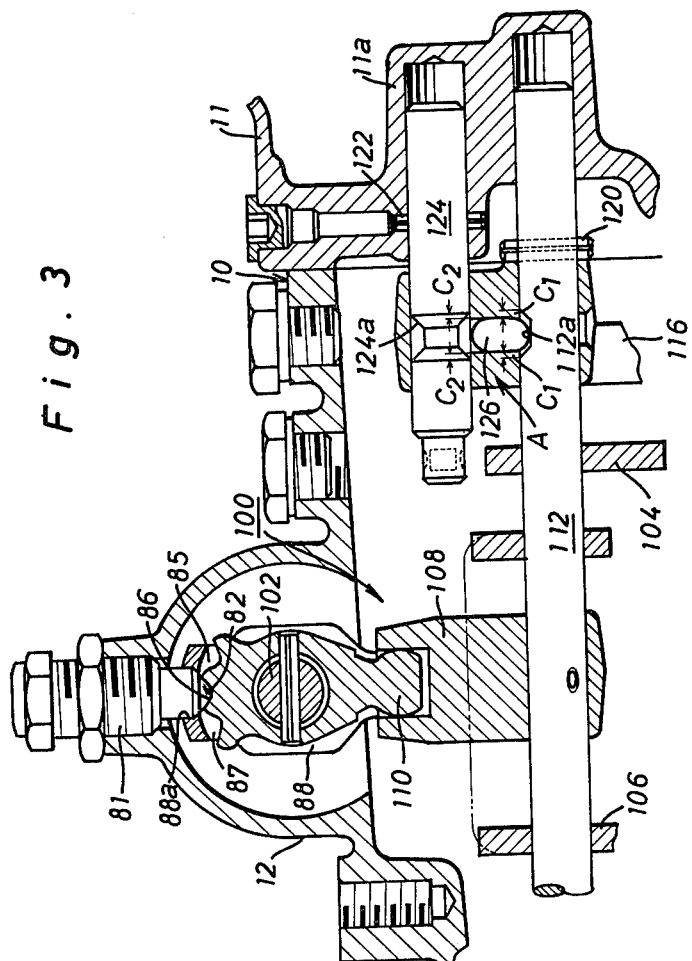
FIG. 3 is an enlarged sectional view illustrating a portion of FIG. 1.

As can be well seen in FIGS. 1, 2 and 3, the detent mechanism 80 includes a cylindrical plug member 81 adjustably threaded into the transmission casing 12, a metallic ball 82 rotatably assembled within the inner end portion of plug 81, a cylindrical ball retainer 83 axially slidable within plug 81 to retain the ball 82 in place, and a compression coil spring 84 assembled within plug 81 to bias the ball 82 toward the inner lever member 110. The inner lever member 110 is formed at its head portion with equiangularly spaced axial detent grooves 85, 86, 87 in which the ball 82 is selectively retained under load of spring 84. The axial detent grooves 85, 86, 87 are arranged in parallel with the axis of shaft 102. The detent mechanism 80 further includes a holder member 88 which is rotatably and slidably mounted on shaft 102. The holder member 88 is formed at its head portion with an axial hole 88a in which the inner end of plug 81 extends to restrict rotary movement of holder member 88. In such arrangement, the holder member 88 is centered by opposed biasing forces of compression coil springs 75, 76 to restrict axial movement of shift fork 104 and shift head 108 along a fork shaft 112. Thus, the detent mechanism 80 acts to define each neutral position of shift forks 104, 106, and shift head 108 and to define each shifted position of the same. The shift head 108 is fixedly mounted on fork shaft 112 which is axially slidably supported from trans-axle casing 11 and transmission casing 12. The fork shaft 112 is arranged to be axially moved in shifting operation of the shift lever toward the fifth speed position or the reverse position and to be positioned in its shifted position under operation of the detent mechanism 80.

The gear-shift mechanism 100 includes the shift and select shaft 102, the shift forks 104, 106, the shift head 108, the inner lever member 110, the fork shaft 112, a shift fork 114 fixed to the left end of fork shaft 112 for the fifth speed, a reverse shift head member 116 connected to fork shaft 112 through a one-way engagement mechanism A, and a shift arm 118 linked with the reverse shift head member 116. The one-way engagement mechanism A includes a spring pin 120 fixed to the fork shaft 112 and arranged to abut against the right end of reverse shift head member 116 as shown in FIGS. 1 and 3. The fork shaft 112 is formed with an annular recess 112a, and a guide shaft 124 is formed with an annular recess 124a. The guide shaft 124 is carried on a boss portion 11a of trans-axle casing 11 in parallel with fork shaft 112 and is fixed by a spring pin 122 in place. The one-way engagement mechanism A further includes a lock pin 126 which is radially movable within the head portion of member 116 to selectively engage the annular recess 112a or 124a so as to effect engagement of the reverse shift head member 116 with the fork shaft 112 or guide shaft 124. In such arrangement of mechanism A, the reverse shift head member 116 is connected with the guide shaft 124 when the fork shaft 112 is shifted to and away from the fifth speed position. When the fork shaft 112 is shifted to and away from the reverse position, the reverse shift head member 116 is connected with the fork shaft 112 to be shifted together with the same. It is noted that axial clearances $C_1$, $C_2$ between the lock pin 126 and the annular recesses 112a, 124a are provided to avoid assembling failure caused by error in the manufacturing process.

Figure 4:
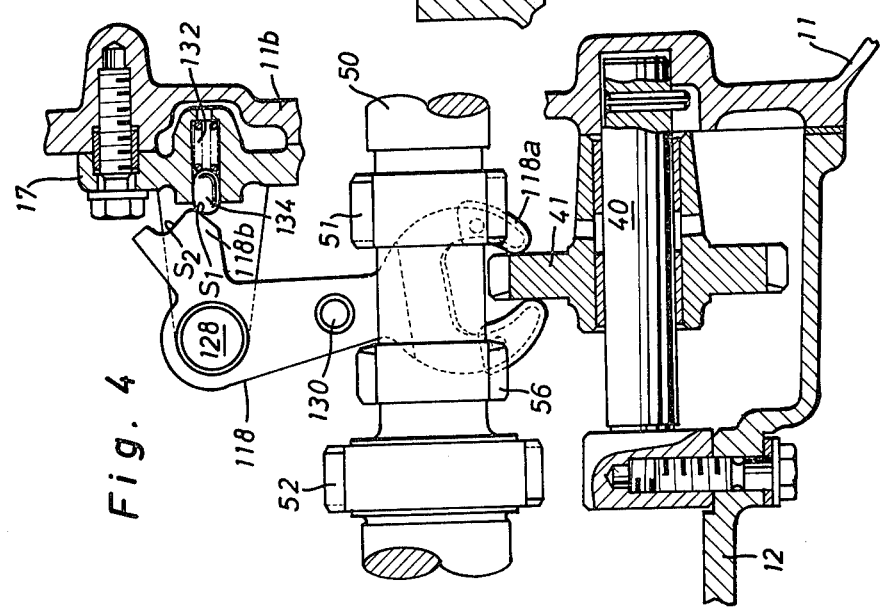
FIG. 4 is an enlarged sectional view illustrating the main portion of the gear-shift mechanism conditioned in its neutral position.

As can be well seen in FIGS. 2 and 4, the shift arm 118 is pivoted by a pin 128 on a bracket 17 which is bolted to the vertical wall 11b of trans-axle casing 11. The shift arm 118 is integrally provided at its intermediate portion with a support pin 130 to which the reverse shift head member 116 is linked to effect swing movement of shift arm 118 in its shifting operation toward the reverse position. The shift arm 118 is adapted to carry a reverse idler gear 41 at its fork portion 118a. The reverse idler gear 41 is axially slidable on a reverse idler shaft 40 supported from the trans-axle casing 11 and transmission casing 12, which idler gear 41 is arranged to be brought into engagement with both the reverse driving and driven gears 56 and 66. When the reverse shift head member 116 is in its neutral position as shown in FIGS. 1 and 3, the shift arm 118 is in its neutral position to retain the reverse idler gear 41 in its disengaged position as shown in FIG. 4. When the reverse shift head member 116 is shifted toward the reverse position as shown in FIG. 5, the shift arm 118 is swung to effect engagement of the reverse idler gear 41 with the reverse driving and driven gears 56 and 66 as shown in FIG. 6.

In this embodiment, the shift arm 118 is formed with a cam portion 118b which is in engagement with a cam follower 134 movable in a boss portion of bracket 17. The cam follower 134 is loaded by a compression coil spring 132 within the boss portion toward the cam portion 118b of shift arm 118. As is illustrated in FIG. 4, the cam portion 118b of shift arm 118 is formed with first and second cam faces $S_1$ and $S_2$, the former being arranged to engage the cam follower 134 in the neutral position of shift arm 118, and the latter being arranged to engage the cam follower 134 in the reverse position of shift arm 118, as shown in FIG. 6. The shift arm 118 is arranged to be loaded counterclockwisely by engagement of the first cam face $S_1$ with the cam follower 134 under the load of spring 132 and is arranged to be loaded clockwisely by engagement of the second cam face $S_2$ with the cam follower 134 under the load of spring 132. The load acting on shift arm 118 is determined by each inclined angle of cam faces $S_1$, $S_2$ and pre-load of the coil spring 132.

In this embodiment, the load on shift arm 118 is determined to be less than that acting on the inner lever member 110 of detent mechanism 80. In this respect, it is noted that when the reverse shift head member 116 is in its neutral position or shifted away from the reverse position, the load acting on shift arm 118 is less than that acting on the inner lever member 110 of detent mechanism 80 but sufficient to separate the reverse idler gear 41 from both the reverse driving and driven gears 56 and 66. When the reverse shift head member 116 is shifted to the reverse position, the load acting on shift arm 118 is less than that acting on the inner lever member 110 but sufficient to effect engagement of the reverse idler gear 41 with the reverse driving and driven gears 56 and 66. In addition, the reverse idler gear 41 is arranged to abut against the inner wall of transaxle casing 11 when the reverse shift head member 116 is in its neutral position, as shown in FIG. 4.

In operation of the gear-shift mechanism 100, when the fork shaft 112 is retained in its neutral position by detent mechanism 80 as shown in FIG. 3, the axial clearances $C_1$ in annular recess 112a will permit slight movement of the reverse shift head member 116, shift arm 118 and reverse idler gear 41. Under such condition, the engagement of the first cam face $S_1$ of shift arm 118 with the cam follower 134 acts to resiliently retain the reverse shift head member 116, shift arm 118 and reverse idler gear 41 in place as shown in FIG. 4. This serves to eliminate occurrence of noises caused by undesired vibration of the shift head member 116, shift arm 118 and reverse idler gear 41. When the fork shaft 112 is shifted to the reverse position from its neutral position and retained in the shifted position by detent mechanism 80, the reverse shift head member 116 is shifted toward the reverse position by abutment with spring pin 120 to effect engagement of the second cam face $S_2$ of shift arm 118 with the cam follower 134, and the reverse idler gear 41 is brought into engagement with both the reverse driving and driven gears 56 and 66, as is illustrated in FIG. 6. In such operation, as is illustrated in FIG. 5, the engagement of the second cam face $S_2$ with the cam follower 134 acts to slightly push the reverse shift head member 116 toward the reverse position due to the axial clearances $C_1$ under the load of spring 132 thereby to ensure the engagement of reverse idler gear 41 with gears 56, 66. This serves to prevent decrease of the gear strength, occurrence of gear noises or the like caused by insufficient engagement of the gears 41, 56, 66.

Furthermore, when the fork shaft 112 is shifted to its neutral position from the reverse position and retained in place by detent mechanism 80, the reverse shift head member 116 is shifted to its neutral position by engagement with the fork shaft 112 through lock pin 126 to effect engagement of the first cam face $S_1$ of shift arm 118 with the cam follower 134, and the reverse idler gear 41 is disengaged from gears 56 and 66, as is illustrated in FIG. 4. In such operation, the engagement of the first cam face $S_1$ with the cam follower 134 acts to slightly push the reverse shift head member 116 to its neutral position under the load of spring 132 after the fork shaft 112 is retained in its neutral position, and the reverse idler gear 41 resiliently abuts against the inner wall of trans-axle casing 11. This serves to ensure the disengagement of reverse idler gear 41 from gears 56, 66 so as to prevent undesired meshing noises between gears 41 and 66 when the change-over sleeve 67 is shifted to its first speed position to connect the first driven gear 61 to the output shaft 60.

In the actual practices of the present invention, the arrangement of cam portion 118b and cam follower 134 may be modified as illustrated in FIGS. 7 and 8, in which the first and second cam faces $S_1$ and $S_2$ are formed on the back face of an enlarged portion 118b of shift arm 118, and the spring loaded cam follower 134 is assembled within bracket 17. The spring loaded cam follower may be assembled within shift arm 118, and the first and second cam faces may be formed on the bracket 17 or the inner wall of housing assembly 10. Alternatively, the spring loaded cam follower may be assembled within the peripheral wall of housing assembly 10, and the first and second cam faces may be formed on the reverse shift head member 116 or vice-versa. In such modifications, the same function and effect as those in the above embodiment will be obtainable. Furthermore, one of the reverse idler gear 41, reverse shift head member 116 and shift arm 118 may be arranged to abut the inner wall of housing assembly 10 when the shift head member 116 is retained in its neutral position.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a gear-shift mechanism for a power transmission unit including input and output shafts supported in parallel to each other from a housing assembly for said unit, an idler shaft supported in parallel with said shafts from said housing assembly, driving and driven gears respectively mounted on said input and output shafts, an idler gear axially slidable on said idler shaft, a fork shaft slidably supported in parallel with said idler shaft from said housing assembly and being operatively connected to a manual shift lever to be selectively shifted from its neutral position to a forward or reverse position, a detent mechanism mounted on said housing assembly for selectively retaining said fork shaft in its neutral and shifted positions under a resilient load acting thereon, a shift head member slidable on said fork shaft, a one-way engagement mechanism for effecting engagement of said shift head member with said fork shaft in axial movement of said fork shaft to and away from its reverse position, and a shift arm member pivoted to the inner wall structure of said housing assembly and linked with said shift head member, and in which said idler gear is carried by said shift arm member to be retained in its neutral position and to be engaged with said driving and driven gears in the axial movement of said fork shaft to its reverse position;

the improvement wherein one of said shift arm member and said shift head member is provided with means for effecting disengagement of said idler gear from said driving and driven gears under a resilient load less than that acting on said detent mechanism when said shift head member is shifted away from its reverse position to be retained in its neutral position, and wherein at least one of said idler gear, said shift arm member and said shift head member is arranged to abut against a stationary portion in said housing assembly.

2. A gear-shift mechanism for a power transmission unit as set forth in claim 1, wherein said means for effecting disengagement of said idler gear from said driving and driven gears comprises a cam portion of said shift arm member which is formed with a cam face, and a spring loaded cam follower means assembled within the inner wall structure of said housing assembly and being in engagement with said cam face of said shift arm member for effecting disengagement of said idler gear from said driving and driven gears when said shift head member is shifted away from its reverse position to be retained in its neutral position.

3. A gear-shift mechanism for a power transmission unit as set forth in claim 1, wherein said shift arm member is pivoted at its one end to the inner wall of said housing assembly and linked at its intermediate portion with said shift head member to be swung in response to axial movement of said shift head member, and wherein said means for effecting disengagement of said idler gear from said driving and driven gears comprises a cam portion of said shift arm member which is located at the pivoted end of said shift arm member and formed at its one side with a cam face, and a spring loaded cam follower means assembled within the inner wall structure of said housing assembly and being in engagement with said cam face of said shift arm member for effecting disengagement of said idler gear from said driving and driven gears when said shift head member is shifted away from its reverse position to be retained in its neutral position.

4. A gear-shift mechanism for a power transmission unit as set forth in claim 1, wherein said shift arm member is pivoted at its one end to the inner wall of said housing assembly and linked at its intermediate portion with said shift head member to be swung in response to axial movement of said shift head member, and wherein said means for effecting disengagement of said idler gear from said driving and driven gears comprises an enlarged cam portion of said shift arm member which is located at the pivoted end of said shift arm member and formed at its back face with a cam face, and a spring loaded cam follower means assembled within the inner wall structure of said housing assembly and being in engagement with said cam face of said shift arm member for effecting disengagement of said idler gear from said driving and driven gears when said shift head member is shifted away from its reverse position to be retained in its neutral position.

5. A gear-shift mechanism as set forth in claim 2, 3 or 4, wherein said spring loaded cam follower means is assembled within a bracket secured to the inner wall of said housing assembly and is arranged at a place corresponding with said cam face of said shift arm member.

6. A gear-shift mechanism as set forth in claim 1, 2, 3 or 4, further comprising a guide shaft fixedly supported in parallel with said fork shaft from said housing assembly and being formed thereon with an annular recess at a place defining the neutral position of said fork shaft, and wherein said fork shaft is formed thereon with an annular recess corresponding with said annular recess of said guide shaft, said shift head member is slidably mounted on both said guide shaft and said fork shaft, and said one-way engagement mechanism includes a lock pin radially movable within the mounted portion of said shift head member to selectively engage said annular recesses with a predetermined axial clearance in axial movement of said fork shaft.

7. A gear-shift mechanism for a power transmission unit as set forth in claim 1, 2, 3 or 4, wherein said idler gear is arranged to abut against the inner wall of said housing assembly when said shift head member is shifted away from its reverse position to be retained in its neutral position.

* * * * *